United States Patent
Karaoguz et al.

(10) Patent No.: US 8,533,770 B2
(45) Date of Patent: Sep. 10, 2013

(54) MEDIA PROCESSING SYSTEM SUPPORTING USER CAPTURED MEDIA DISPLAY SEQUENCING WHEN IN IDLE STATE

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1838 days.

(21) Appl. No.: 10/667,829

(22) Filed: Sep. 22, 2003

(65) Prior Publication Data

US 2004/0117847 A1    Jun. 17, 2004

Related U.S. Application Data

(60) Provisional application No. 60/444,098, filed on Jan. 30, 2003, provisional application No. 60/432,472, filed on Dec. 11, 2002, provisional application No. 60/443,894, filed on Jan. 30, 2003.

(51) Int. Cl.
| | |
|---|---|
| H04N 7/173 | (2011.01) |
| H04N 5/445 | (2011.01) |
| G06F 3/00 | (2006.01) |
| G06F 13/00 | (2006.01) |

(52) U.S. Cl.
USPC ............... 725/134; 725/37; 725/131

(58) Field of Classification Search
USPC ............ 725/37, 32, 34, 39, 44, 47, 100, 131, 725/134, 139, 142
See application file for complete search history.

(56) References Cited

U.S. PATENT DOCUMENTS

| | | | | |
|---|---|---|---|---|
| 6,145,083 | A * | 11/2000 | Shaffer et al. | 726/7 |
| 6,308,329 | B1 * | 10/2001 | Takahashi | 725/153 |
| 6,601,237 | B1 * | 7/2003 | Ten Kate et al. | 725/47 |
| 6,973,664 | B2 * | 12/2005 | Fries | 725/42 |
| 2002/0054752 | A1 * | 5/2002 | Wood et al. | 386/83 |
| 2002/0166127 | A1 * | 11/2002 | Hamano et al. | 725/105 |
| 2004/0261096 | A1 * | 12/2004 | Matz | 725/28 |

* cited by examiner

*Primary Examiner* — John Schnurr
(74) *Attorney, Agent, or Firm* — Garlick & Markison

(57) ABSTRACT

A system and method for supporting the playback of user captured media when in an idle state is disclosed. An embodiment of the present invention may permit a user to select media content to be displayed or played at one or more display devices interfaced to a media processing system, when the media processing system is in an idle state. The media content may comprise audio, still images, video, and data, and may be pushed to the media processing system via a communication network that may be the Internet. A user of a media processing system may select the media content using a media guide interface, and may choose when the media processing system enters an idle state.

36 Claims, 13 Drawing Sheets

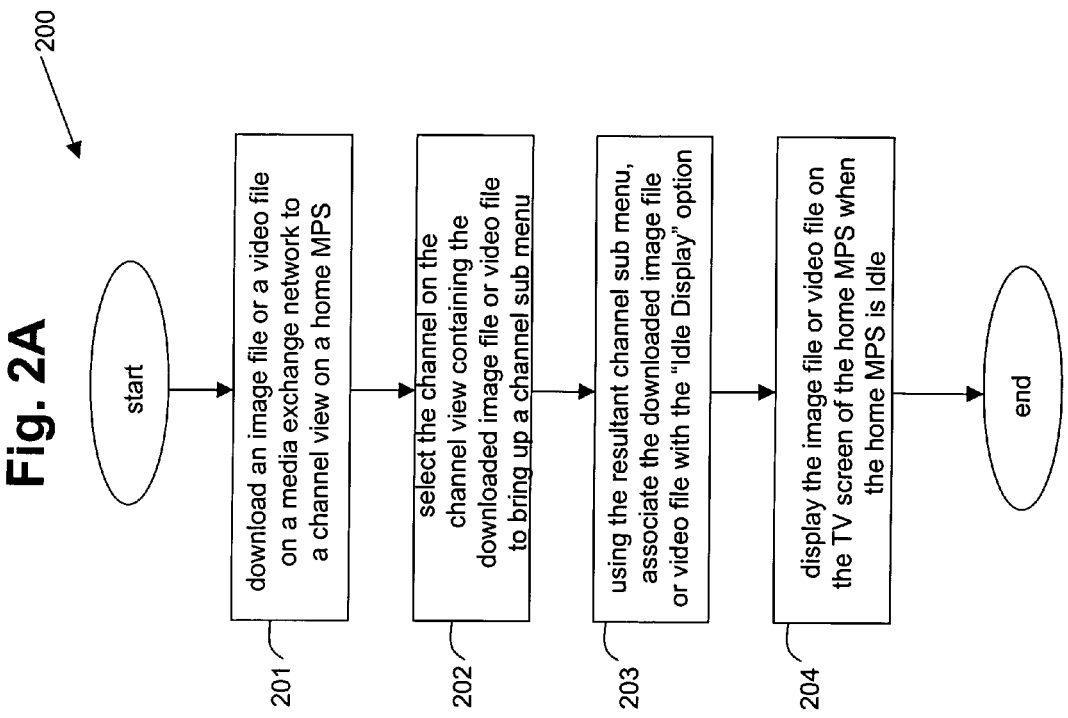

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO  *802* | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO  *803* | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO  *804* | Overnight Delivery: Avail Nxt Morning Cost: 5c (Server Stored) | | | Showing All Day (48 Min), Earliest Order Time: 4:00PM MPEG-2 19 Mbps | |

MEDIA PROCESSING SYSTEM SUPPORTING USER CAPTURED MEDIA DISPLAY SEQUENCING WHEN IN IDLE STATE

CROSS-REFERENCE TO RELATED APPLICATIONS/INCORPORATION BY REFERENCE

This application makes reference to, and/or claims priority to, and/or claims the benefit of U.S. Provisional Patent Application 60/444,098, entitled "Media Processing System Supporting User Captured Media Display Sequencing When in Idle State", filed Jan. 30, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety. In addition this application makes reference to U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003, the complete subject matter of which are hereby incorporated herein by reference, in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A personal computer (PC) is often programmed to display a sequence of images or a stream of video as a screen saver for the monitor of the PC. A screen saver program, or several screen saver programs, may be programmed into the PC at the factory or may be downloaded to the PC from another source such as a web site on the Internet or another PC. The screen saver program is locally stored on the PC and is triggered when what is being displayed on the monitor has not changed for a certain period of time even though the PC and monitor are turned on.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a system supporting media display sequencing. Such a system may comprise a television display at a first location, storage at the first location for storing media, a user interface for identifying media as one of idle state media and scheduled media, and set top box circuitry at the first location. The set top box circuitry may be communicatively coupled to support consumption of at least one of idle state media and scheduled media by the first television display, and may cause the displaying from the storage of idle state media when no scheduled media is available. The identified media may comprise at least one of audio, a still image, video, and data. An embodiment of the present invention may also comprise a packet network interface communicatively coupled to the set top box. The packet network interface may be compatible with at least one of a cable infrastructure, a satellite network infrastructure, a digital subscriber line (DSL) infrastructure, an Internet infrastructure, an intranet infrastructure, a wired infrastructure, and a wireless infrastructure.

In addition, an embodiment of the present invention may comprise at least one display device at a second location communicatively coupled to the set top box; and the set top box circuitry may cause the display of idle state media using the at least one display device when no scheduled media is available. The at least one display device may be one of a plasma display, a liquid crystal display, and a TV screen. Another embodiment may comprise at least one media capture device communicatively coupled to the storage, where the at least one media capture device comprises one of a digital camera, a digital camcorder, a DVD player, and a CD player. The identified media in an embodiment of the present invention may be pushed to the system.

Other aspects of the present invention may be seen in a method of operating a system supporting user captured media display sequencing. A method in accordance with the present invention may comprise identifying media as one of idle state media and scheduled media based upon input from a user at a first location. The method may also comprise causing the displaying of the idle state media at the first location according to a user defined sequence if no scheduled media is available, and refraining from causing the displaying of the idle state media if scheduled media is available. The identifying may be performed using at least one of a set top box, a personal computer, and a television, and the identified media may comprise at least one of audio, a still image, video, and data.

In such an embodiment, the displaying may comprise providing the idle state media to a second location according to a user defined sequence when no scheduled media is available, and the displaying may comprise at least one of playing audio, displaying a still image, displaying video, and displaying data. The method may also comprise receiving media from a second location. The receiving may be performed using a packet network, where the packet network may comprise at least one of a cable infrastructure, a satellite network infrastructure, a digital subscriber line (DSL) infrastructure, an Internet infrastructure, an intranet infrastructure, a wired infrastructure, and a wireless infrastructure. The packet network may be the Internet.

In an embodiment of the present invention, the second location may be a server, where the server may comprise at least one of a 3rd party media provider, a 3rd party service provider, a network server, and a broadband head end.

Yet another aspect of the present invention may be observed in a method of operating a system supporting user captured media display sequencing. Such a method may comprise receiving media at a first location and identifying the media as one of idle state media and scheduled media based upon user input. In addition, the method may comprise causing the displaying of the idle state media at the first location according to a user defined sequence when no scheduled media is available, and refraining from causing the displaying of the idle state media if scheduled media is available. The idle state media may reside on local storage, and the scheduled media may reside on at least one of a local storage, a 3rd party broadcast media provider, a 3rd party service provider, a network server, and a broadband head end. The receiving may use at least one of a cable infrastructure, a satellite network infrastructure, a digital subscriber line (DSL) infrastructure, an Internet infrastructure, an intranet infrastructure, a wired infrastructure, and a wireless infrastructure.

The identified media may comprise at least one of audio, a still image, video, and data, and the displaying may comprise at least one of playing audio, displaying a still image, playing video, and displaying data. The method may also comprise displaying the idle state media at a second location according to a user defined sequence, when no scheduled media is available. In addition, the method may comprise causing immediately the displaying of the idle state media based upon user input.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2A is a flowchart illustrating an embodiment of a method for performing user captured media display sequencing on a media processing system of the media exchange network of FIG. 1, in accordance with various aspects of the present invention.

FIG. 8 is an exemplary illustration of a TV guide channel user interface showing several options of a pushed media in accordance with an embodiment of the present invention.

DETAILED DESCRIPTION OF THE INVENTION

Certain embodiments of the present invention relate to capturing and displaying media. In particular, certain embodiments of the present invention relate to capturing and displaying a sequence of digital images or digital video on a TV screen of a media processing system in a media exchange network during an idle state of the media processing system.

Figure 1:
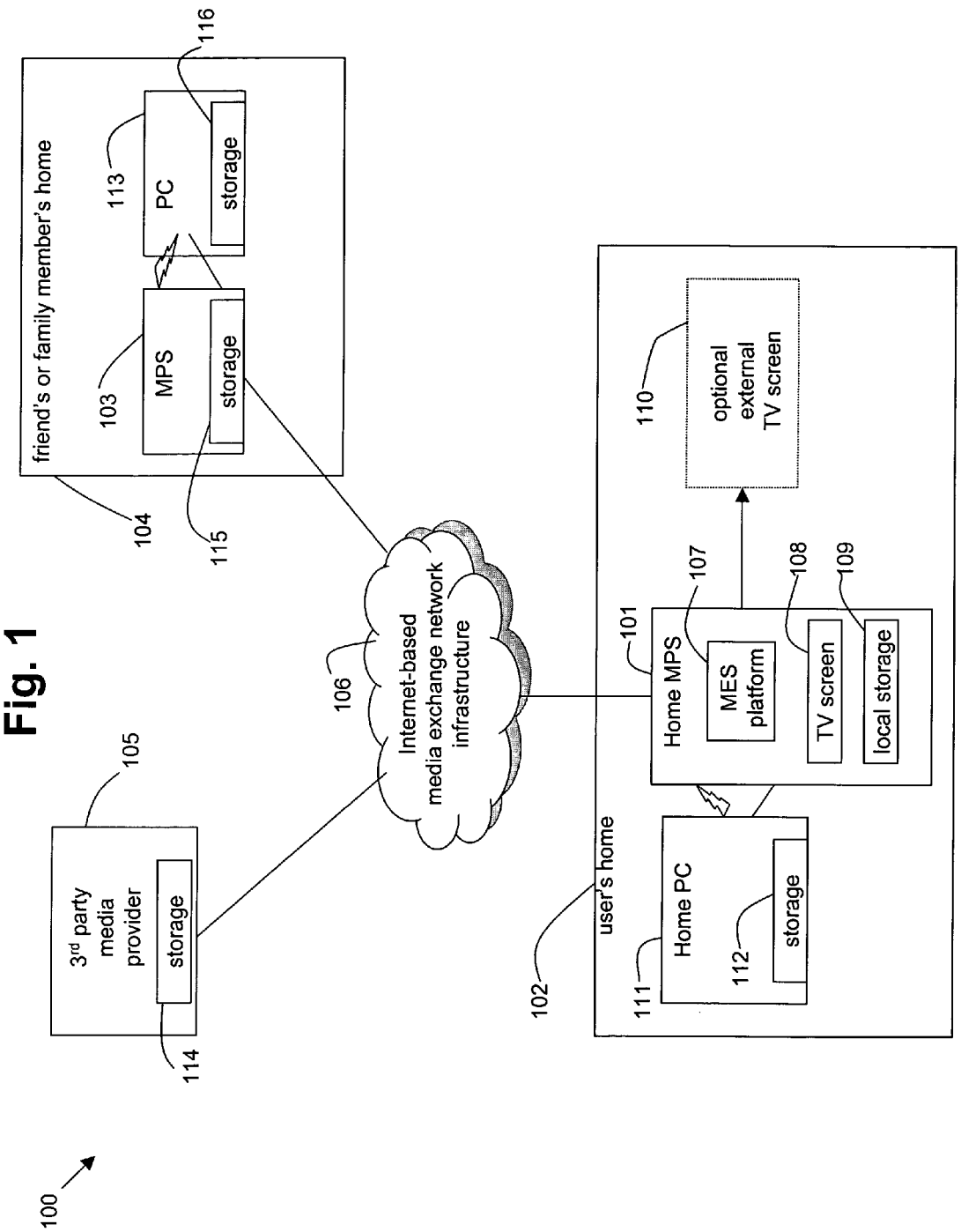
FIG. 1 is a diagram illustrating an embodiment of an exemplary media exchange network supporting user captured media display sequencing on a media processing system in an idle state, in accordance with various aspects of the present invention.

FIG. 1 is a diagram illustrating an embodiment of an exemplary media exchange network 100 supporting user captured media display sequencing on a media processing system in an idle state, in accordance with various aspects of the present invention. Specifically, the media exchange network 100 is a communication network comprising a home MPS (media processing system) 101 located in a user's home 102 of the media exchange network 100, a friend's or family member's MPS 103 located at a friend's or family member's home 104, a $3^{rd}$ party media provider 105, and an Internet-based media exchange network infrastructure 106.

The MPS's 101, 103 and the $3^{rd}$ party media provider 105 each connect to the Internet-based media exchange network infrastructure 106 to allow communication between the various components 101, 103, and 105. The user's home 102 also comprises a home PC 111 interfacing, via a wired or wireless connection, to the home MPS 101. Similarly, the friend's or family member's home 104 also comprises a PC 113 interfacing, via a wired or wireless connection, to the MPS 103. When interfacing to the home MPS 101 or the MPS 103, the home PC 111 and PC 113 are considered to be part of the media exchange network 100. In another embodiment of the present invention, the home PC 111 and PC 113 may be connected to the Internet-based media exchange network infrastructure 106 in a more direct fashion, rather than connecting through the home MPS 101 and MPS 103.

The Internet-based media exchange network infrastructure 106 may comprise, for example, cable infrastructure, satellite network infrastructure, digital subscriber loop (DSL) infrastructure, Internet infrastructure, intranet infrastructure, wired infrastructure, and/or wireless infrastructure providing wide area network (WAN) capability. Each of the entities within the media exchange network infrastructure 106 such as, for example, servers, media processing systems, media peripheral, etc., may be identified using a network protocol address such as, for example, an Internet protocol (IP) address, a media access control (MAC) address, an electronic serial number (ESN), etc.

The home MPS 101 comprises a MES (media exchange software) platform 107. The MES platform 107 provides certain functionality within the home MPS 101 such as the ability to capture and exchange media on the media exchange network 100. Also, the MES platform 107 provides a TV channel guide user interface (channel view) that is displayed on a TV screen of the home MPS 101, in accordance with an embodiment of the present invention. In another embodiment, an MPS may comprise a PC, such as home PC 111 or PC 113, and an MES platform, such as MES platform 107.

The various components of the media exchange network are able to store digital media and data. The home MPS 101 comprises a local storage area 109. The home PC 111 comprises a storage area 112. The friend's or family member's MPS 103 comprises a storage area 115. The friend's or family member's PC 113 comprises a storage area 116. The $3^{rd}$ party media provider 105 comprises a storage area 114.

As an example, the $3^{rd}$ party media provider 105 may comprise a server storing video in a digital video format in the storage area 114. The PC 113 may store photos in a digital image format at friend's or family member's home 104 in the storage area 116.

The storage areas 109, 112, 114, 115, and 116 may comprise main storage and removable storage. The main storage may comprise, for example, hard disk drives, a DVD player, a CD player, floppy disk drives, RAM, or any combination of these. The removable storage may include, for example, memory sticks, PCM/CIA cards, compact flash cards, or any combination of these. The PC's 111 and 113 may comprise a desktop PC, a notebook PC, a PDA, or any computing device.

The MPS 101 of FIG. 1 includes a TV screen 108 for viewing a channel view, and various sub-menus of each, and for viewing image files or video files, in accordance with various embodiments of the present invention. The channel view is provided by the MES platform 107. As an option, the user's home 102 may include one or more display devices such as TV screen 110 that is external to the home MPS 101 but interfaces to the home MPS 101. For example, the TV screen 110 shown in FIG. 1 may in other embodiments of the present invention be a flat plasma TV screen hanging on a wall in a living room, a liquid crystal display on a shelf or mantel, a large screen display monitor or projection system, or other display device located in and about the user's home 102.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

FIG. 2A is a flowchart illustrating an embodiment of a method 200 for performing user captured media display sequencing on a media processing system of the media exchange network of FIG. 1, in accordance with various aspects of the present invention. In step 201, a sequence of images in an image file or a video file is downloaded to a channel view in a MPS from somewhere on a media exchange network.

In step 202, the channel on the channel view containing the downloaded image file or video file is selected on a TV screen of the MPS in order to bring up and display a channel sub-menu on the TV screen of the MPS. In step 203, using the resultant channel sub-menu, the downloaded image file or video file is associated with an "Idle Display" option on the channel sub-menu. In step 204, the image file or video file is displayed on the TV screen of the MPS when the MPS is in an idle state.

In accordance with an embodiment of the present invention, an idle state of the MPS is entered when the MPS has been in a standby mode or a pause mode for a certain period of time. In a standby mode or a pause mode, the pixels being displayed on the TV screen of the MPS are not being actively changed. The standby mode may be entered due to lack of user interaction with the MPS or due to some background processing that is being performed by the MPS that does not require active updating of the TV screen display. This may occur, for example, when no media content is currently scheduled for display. The pause mode may be entered due to a user specifically pausing the display of media on the TV screen of the MPS or due to some automatic pause feature of the MPS. The user may select the conditions under which the idle state is entered.

Figure 2B:
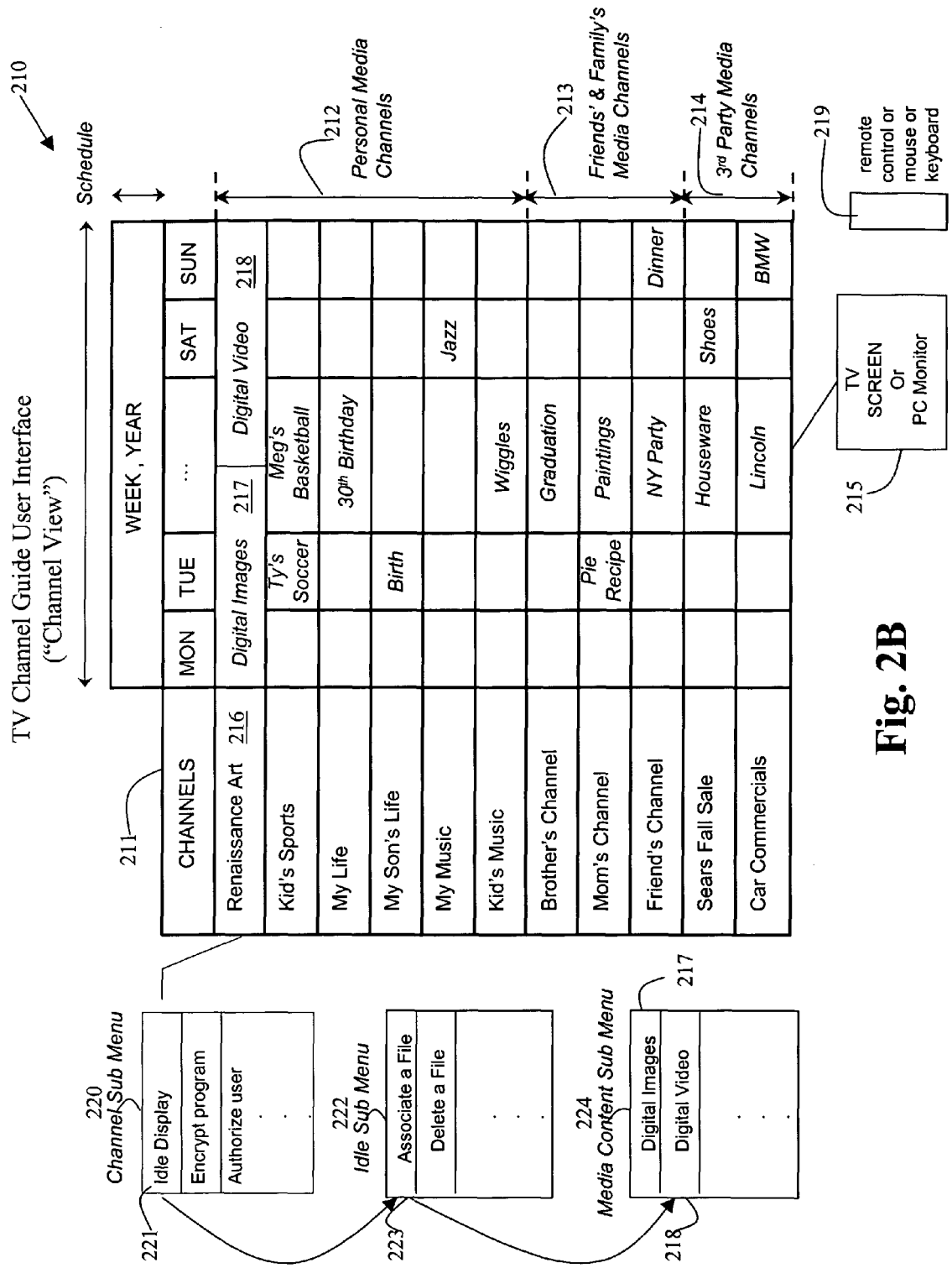
FIG. 2B is a diagram illustrating an embodiment of a TV channel guide user interface supporting the method of FIG. 2A on the media exchange network of FIG. 1, in accordance with various aspects of the present invention.

FIG. 2B is a diagram illustrating an embodiment of a TV channel guide user interface (channel view) 210 supporting the method 200 of FIG. 2A on the media exchange network 100 of FIG. 1, in accordance with various aspects of the present invention. The channel view 210 comprises a table of channels 211 such as personal media channels 212, friends' and family's media channels 213, and $3^{rd}$ party media channels 214 each comprising scheduled media program content. The channel view 210 is provided by a MES (media exchange software) platform (e.g., 107) installed in a MPS (e.g., 101) on a media exchange network (e.g., 100). The channel view 210 may be displayed to a user of the media exchange network on a display device such as TV screen 215 of his MPS (or, for example, TV screen 108, or optional TV screen 110).

As an example, a user of home MPS 101 may be very interested in Renaissance art and may download a file of digital images 217 of Renaissance art from storage area 114 on $3^{rd}$ party media provider 105 via the Internet-based media exchange network infrastructure 106, and store the digital images 217 in the Renaissance art channel 216 of his channel view 210 on the home MPS 101. In a similar manner, the user may also download a file of digital video 218 of a friend's vacation to Rome, containing many scenes of Renaissance art, from storage area 115 on MPS 103.

The user of the home MPS 101 may then select, using a remote control 219, the Renaissance art channel 216 from the channel view 210 displayed on the TV screen 215, causing a channel sub-menu 220 to appear on the TV screen 215. From the channel sub-menu 220, the user may then select the "Idle Display" option 221 which causes the "Idle" sub-menu 222 to appear on the TV screen 215. The "Idle Display" option 221 allows the user to select the condition(s) under which the MPS 101 enters the idle state, and the image file or video file that will be displayed on the TV screen 215 (or TV screen 108 or 110 of FIG. 1) when the home MPS 101 is in the idle state.

From the "Idle" sub-menu 222, the user may then select the "Associate a File" option 223 which causes a "Media Content" sub-menu 224 to appear on the TV screen 215. The "Media Content" sub-menu 224 displays the media content titles that are available in the selected Renaissance art channel 216 (i.e., digital images 217 and digital video 218). The user may then select, for example, digital video 218 from the "Media Content" sub-menu 224. As a result, digital video 218 is then associated with the idle state of the home MPS 101. In other words, whenever the home MPS 101 enters the idle state, as previously defined herein, the selected digital video 218 will be displayed on the TV screen 215.

If the user instead selects the digital images 217 from the "Media Content" sub-menu 224, then the sequence of digital images 217 are displayed when the home MPS 101 enters the idle state. If the external TV screen 110 is used and is hanging on a wall in, for example, the user's living room, then the user will effectively have a sequence of pictures of Renaissance art displayed on his wall when the home MPS 101 is in the idle state, instead of a blank screen or some miscellaneous image that was last displayed to the TV screen 110.

Media that is stored on, for example, the local storage area 109 of the home MPS 101, the storage area 112 of the home PC 111, and the storage area 116 of the PC 113 may also be downloaded to the channel view 210 of the home MPS 101 and associated with the idle state of the home MPS 101, in accordance with various embodiments of the present invention. In another embodiment of the present invention, the MPS 101 and MPS 103 may continue to perform other functions while in the idle state, including the reception of media announcements. Such media announcements may be displayed on, for example, TV screens 108, 110 of FIG. 1, and TV screen 215 of FIG. 2B, and may be shown in the form of an overlay or "pop-up" image display on the TV screen 108, 110 and/or TV screen 215. In yet another embodiment, the display of images may be accompanied by the playback of digital audio, such as music.

As an alternative, media may be automatically pushed from a $3^{rd}$ party provider to a user on the media exchange network. The media may be automatically migrated to the user's channel view and may be automatically associated with the idle state of the user's MPS, in accordance with various aspects of the present invention. As a result, the media displayed during the idle state of a user's MPS may be periodically updated by a $3^{rd}$ party provider based on, for example, a user profile.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
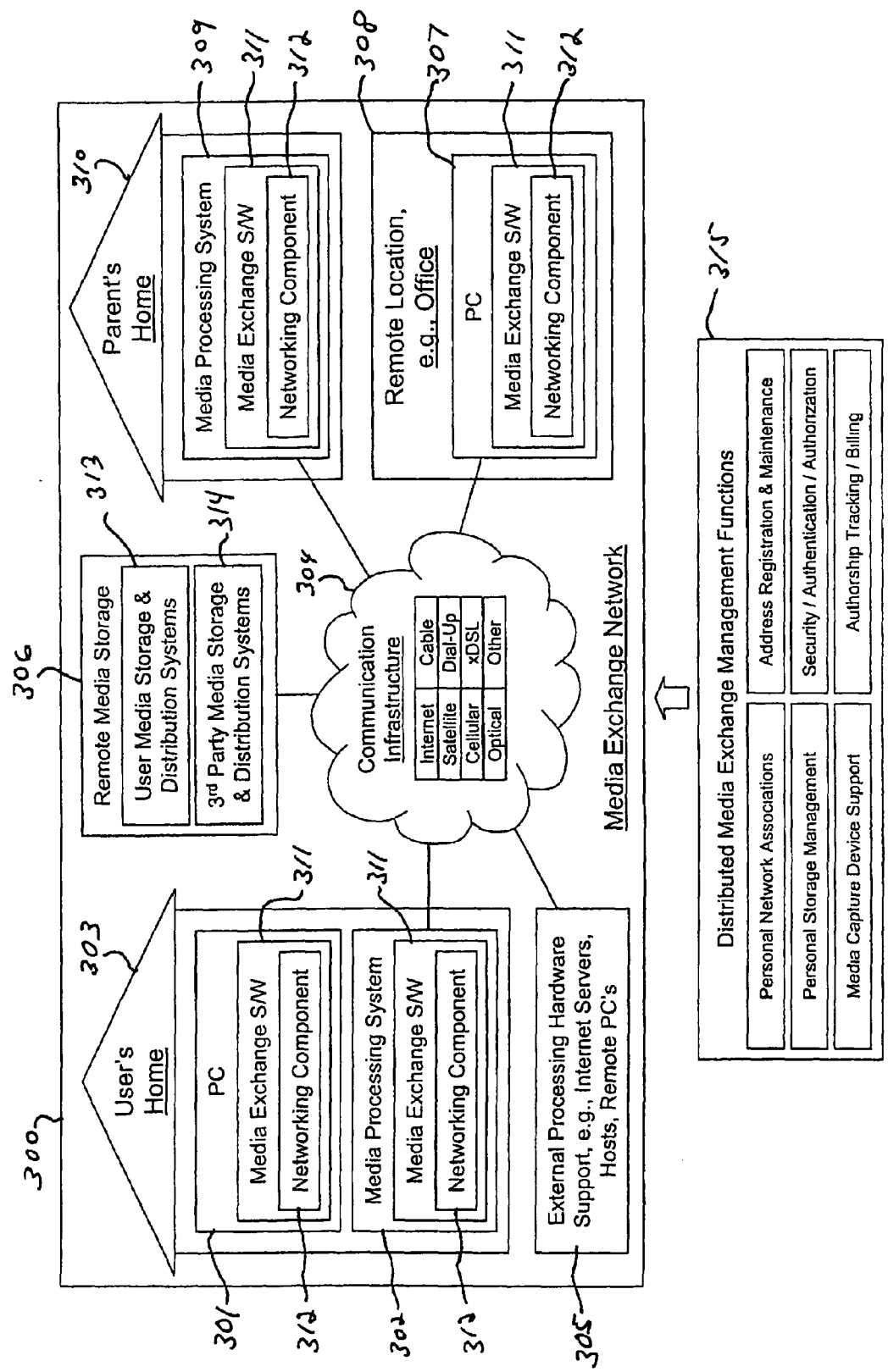
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
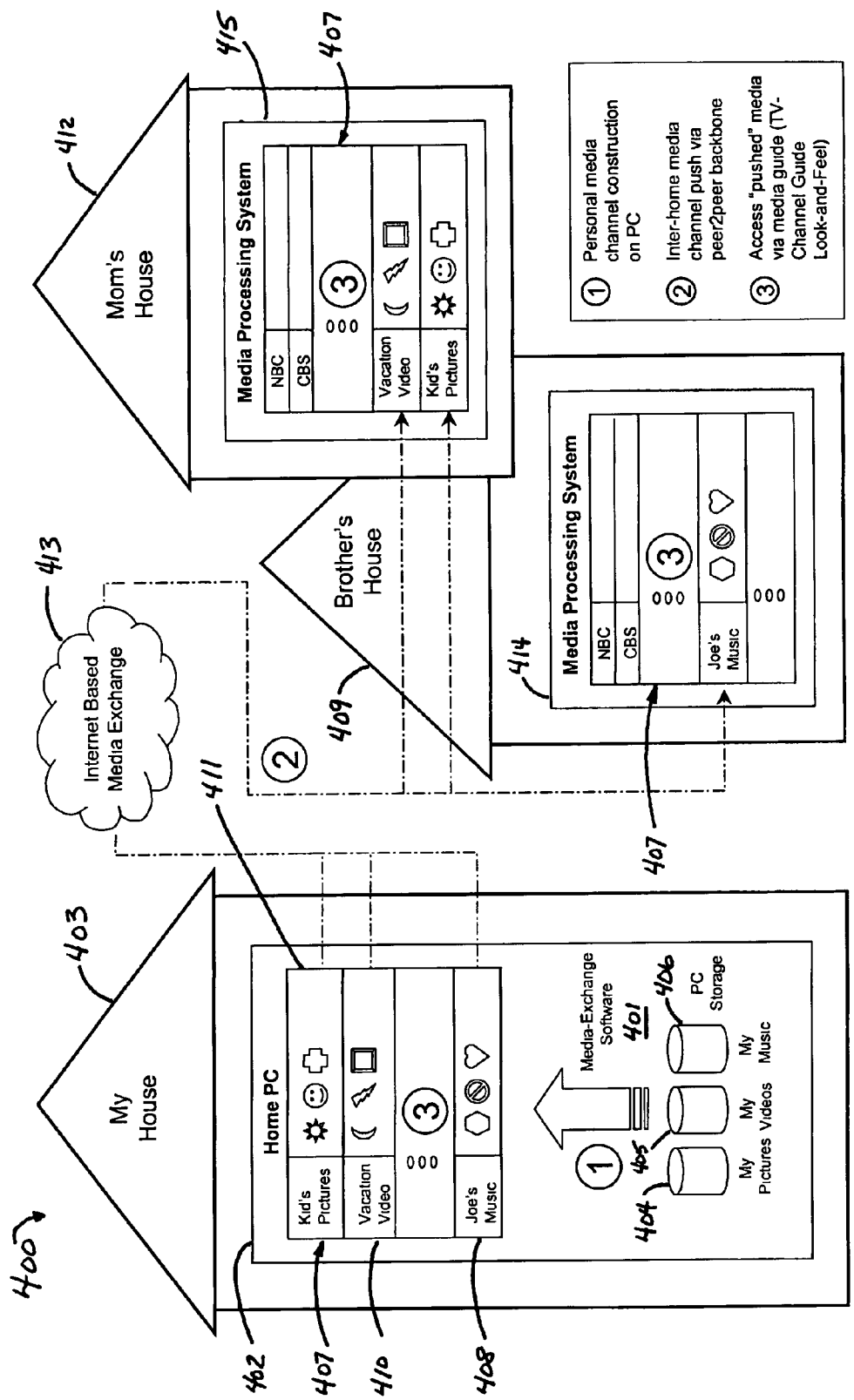
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
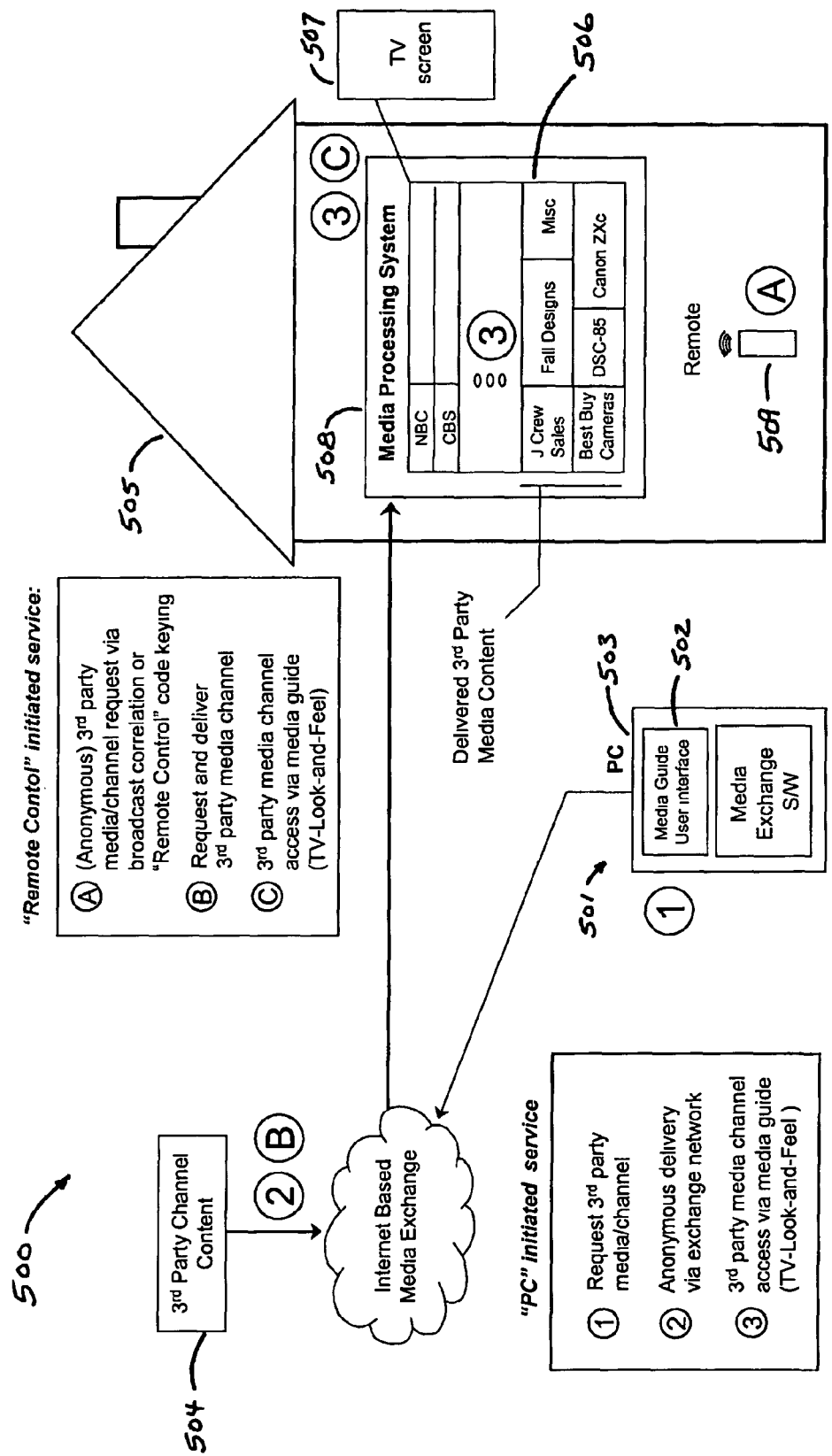
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a TV channel guide look-and-feel user interface 502 on a PC 503. In step 2, an anonymous delivery of the requested third-party channel 504 is made to a second party 505 via the internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
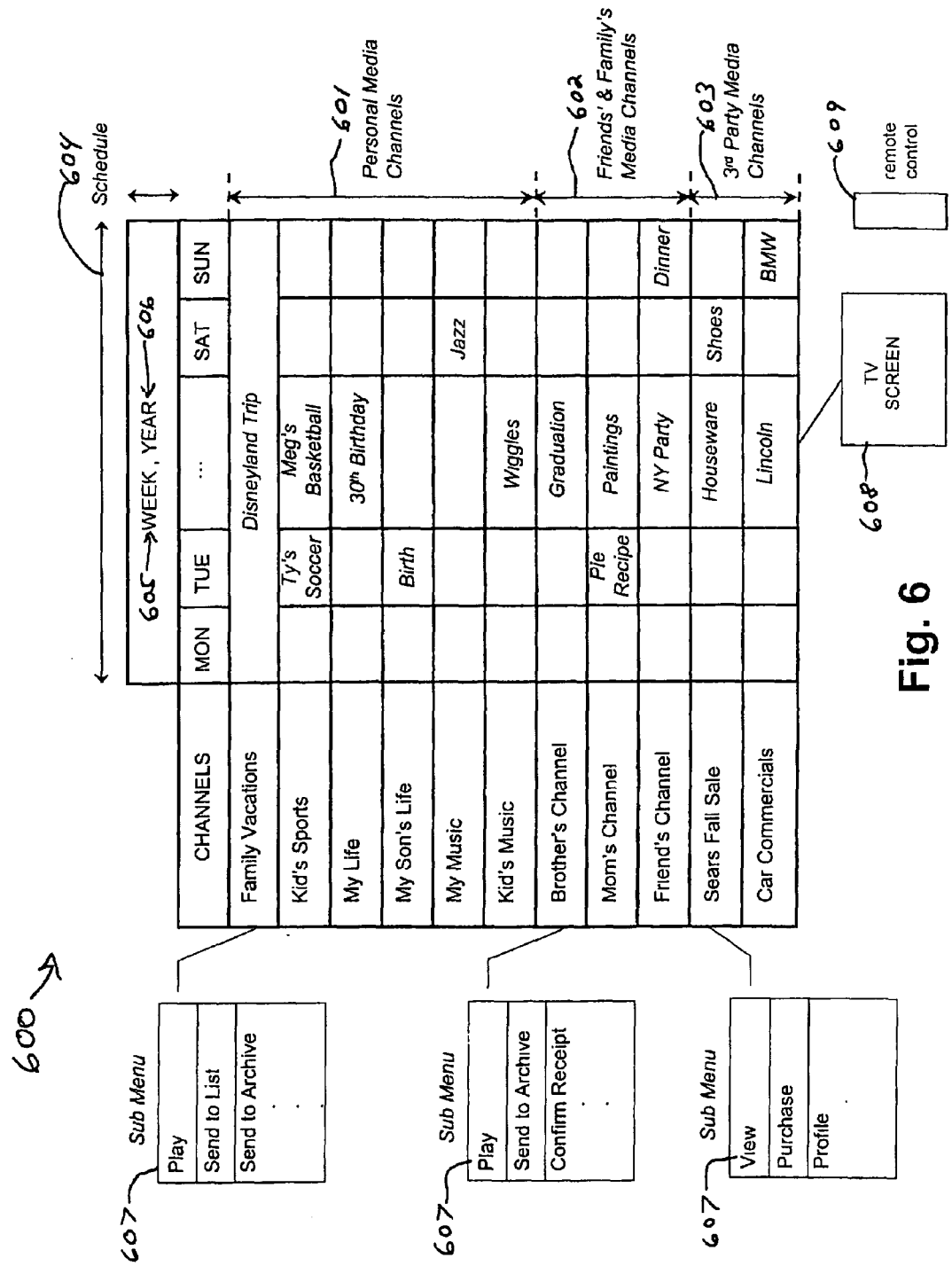
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
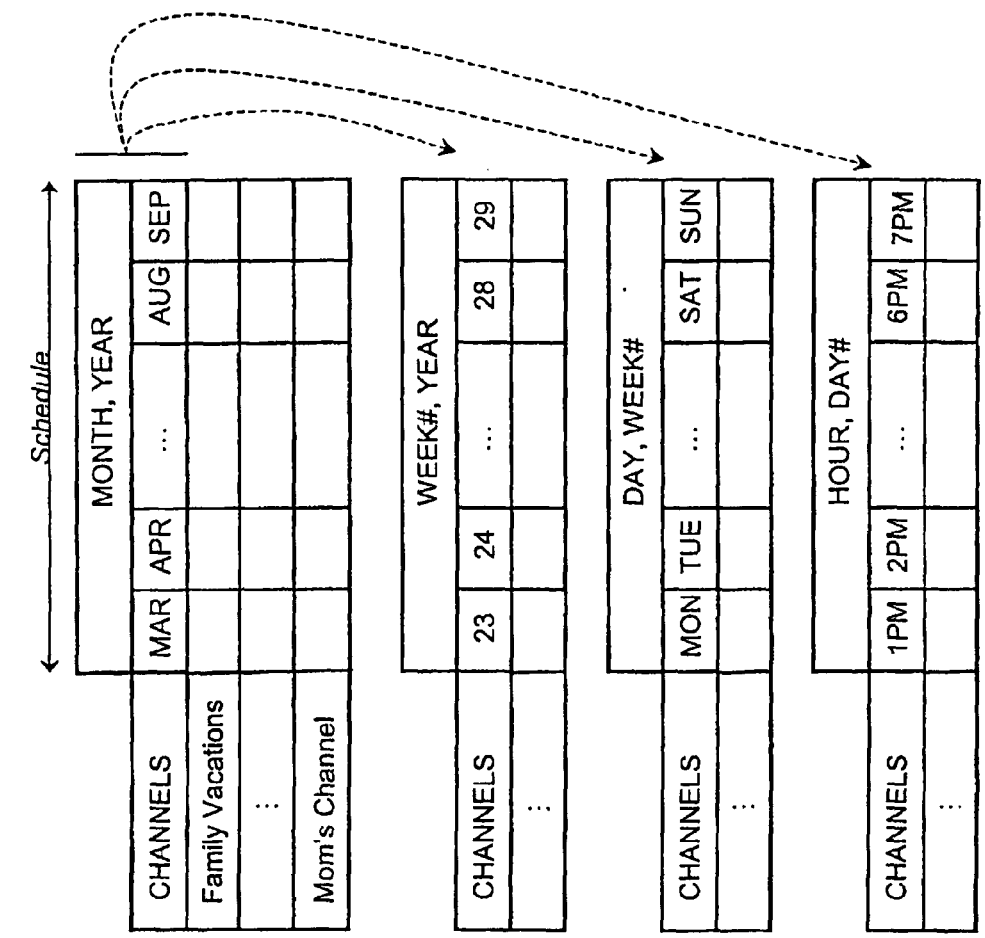
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
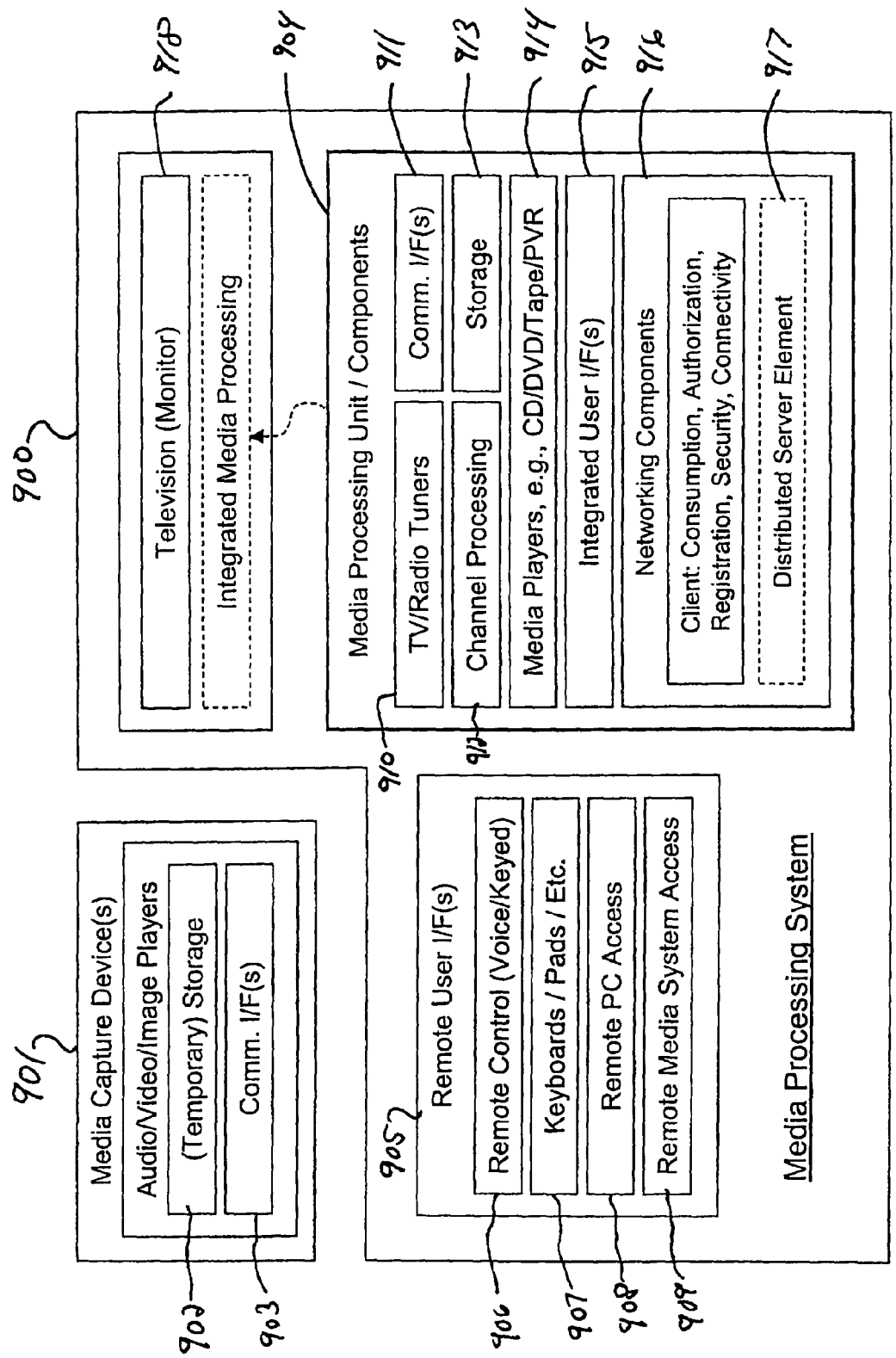
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
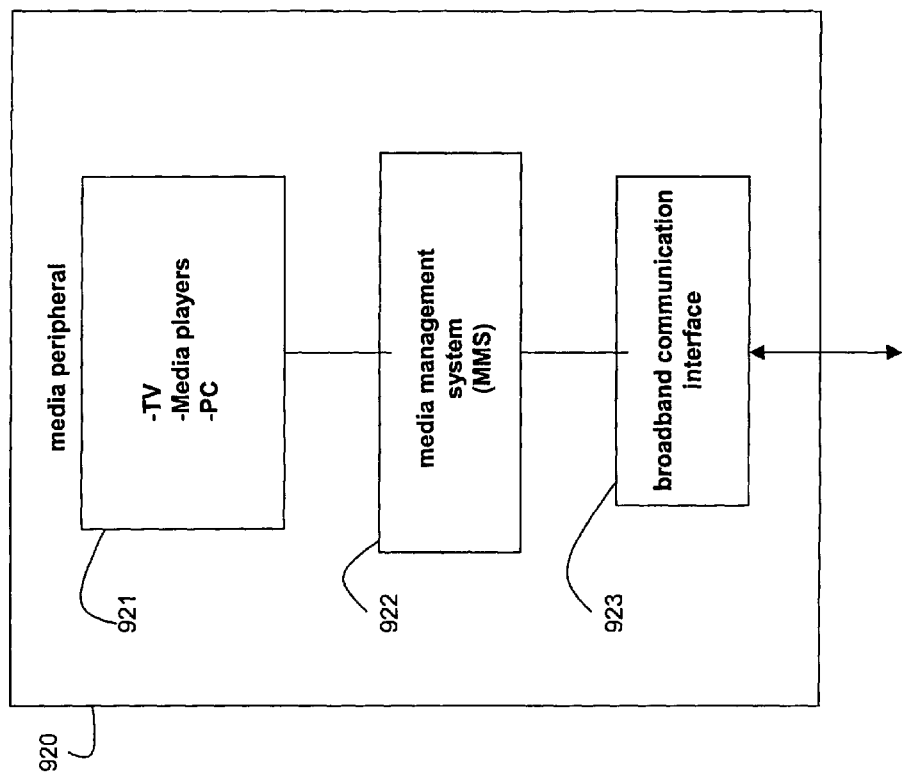
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
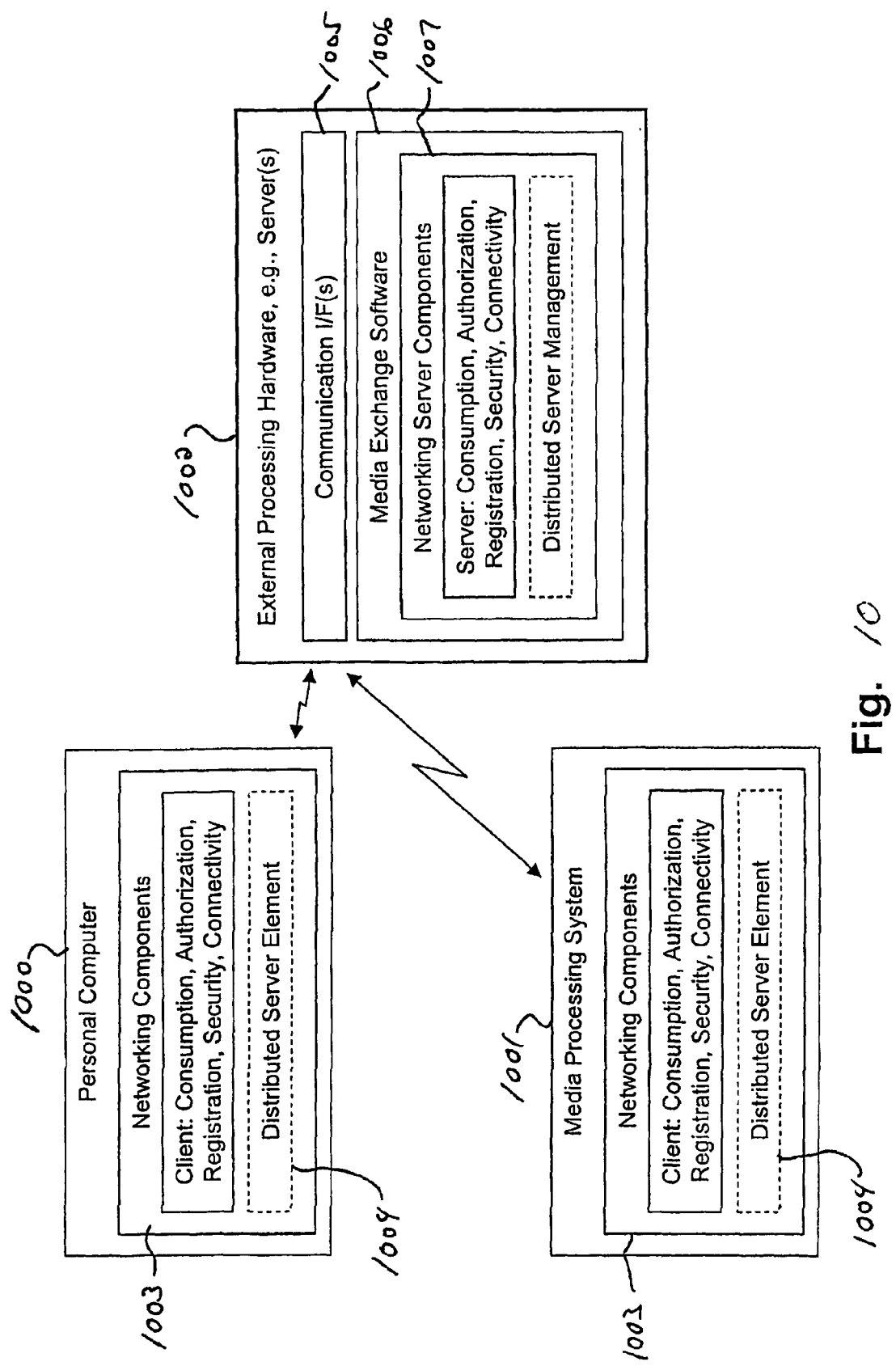
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
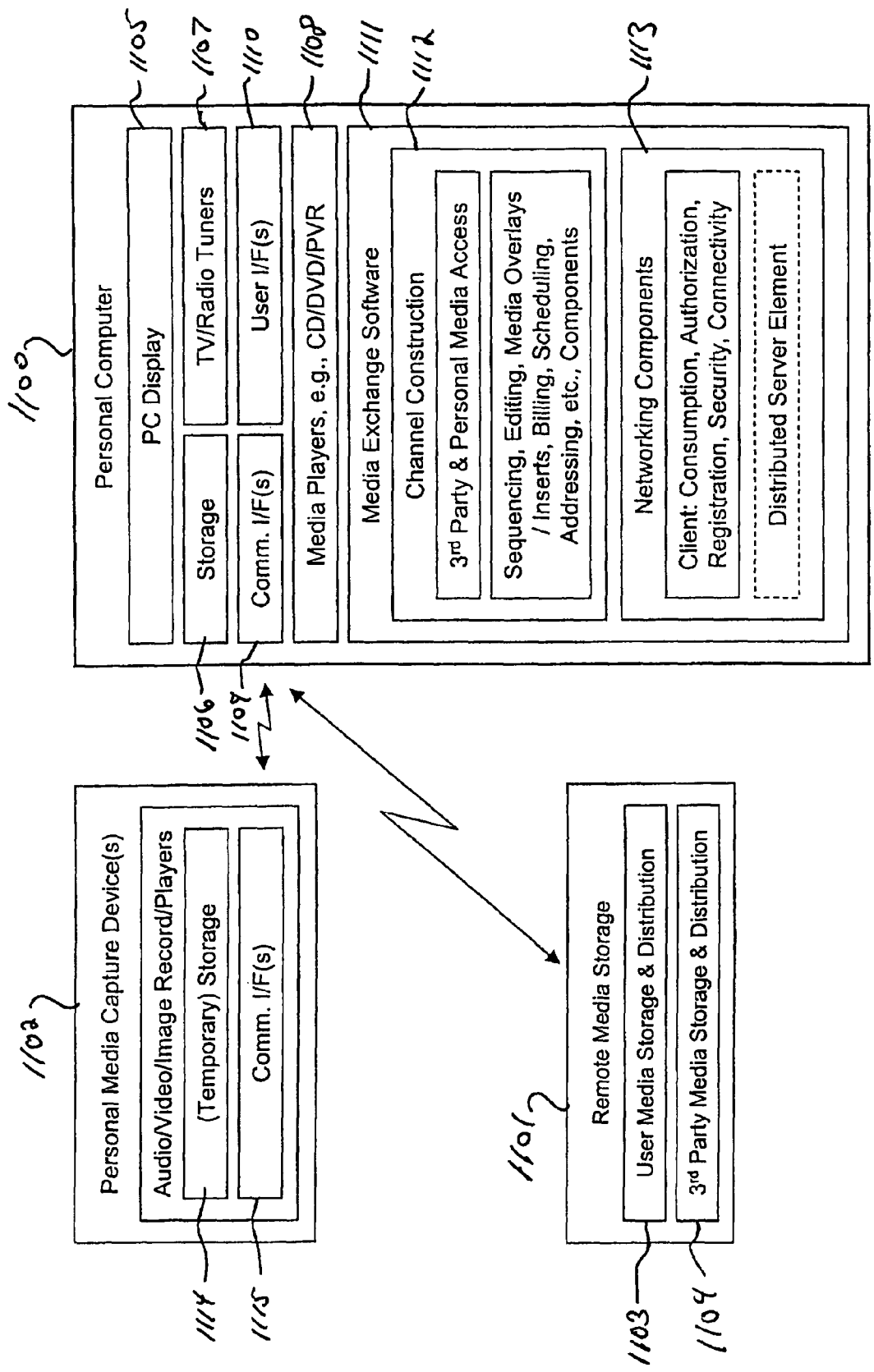
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, a system and method support user captured media display sequencing in a media processing system on a media exchange network. Certain embodiments of the present invention relate to displaying a sequence of digital images or digital video on a TV screen of a MPS when the MPS is in an idle state.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An apparatus to support visual presentations to a viewer via a display, in which the visual presentations are based on a selection made from available non-broadcast, user captured media content, the apparatus comprising:
    an interface to communicate with a user via the display and to receive user input from the user, the interface to also communicate with a storage that stores the available non-broadcast, user captured media content and the interface to retrieve the available non-broadcast, user captured media content from the storage for viewing;
    a processor that is operable, based on user input, to select a sequence of content from the available non-broadcast, user captured media content for viewing on a personal media channel and to support construction of a tailored channel guide for the display to view a time sequence of entries corresponding to the sequence of content selected from the available non-broadcast, user captured media content for viewing on the personal media channel, the processor also operable, based on user input, to support selection of idle state content from the sequence of content of the personal media channel and to display the idle state content on the display, when the display enters an idle state.

2. The apparatus of claim 1, wherein the available non-broadcast, user captured media content includes one or more of audio, still image, video and data.

3. The apparatus of claim 1, wherein the user selects the idle state content by viewing a channel sub-menu of the personal media channel.

4. The apparatus of claim 1, wherein the idle state is entered when the display enters a standby mode.

5. The apparatus of claim 1, wherein idle state is entered when an image on the display is paused.

6. The apparatus of claim 1, wherein the user selects a condition for the display to enter the idle state.

7. The apparatus of claim 6, wherein the user selects and views a channel sub-menu of the personal media channel to select the condition for the display to enter the idle state.

8. The apparatus of claim 6, wherein the user selects the idle state content by viewing the channel sub-menu of the personal media channel.

9. The apparatus of claim 1, wherein the apparatus is a set-top box.

10. The apparatus of claim 1, wherein the apparatus is a computer.

11. The apparatus of claim 1, wherein the apparatus is included in a television.

12. The apparatus of claim 1, wherein the display is a television.

13. A system to support visual presentations to a viewer via a display, in which the visual presentations are based on a selection made from available non-broadcast, user captured media content, the system comprising:
   a storage that stores the available non-broadcast, user captured media content;
   software that is operable with a processor, based on user input, to select a sequence of content from the available non-broadcast, user captured media content for viewing on a personal media channel;
   the software being operable to support construction of a tailored channel guide for the display to view a time sequence of entries corresponding to the sequence of content selected from the available non-broadcast, user captured media content for viewing on the personal media channel; and
   the software also operable, based on user input, to support selection of idle state content from the sequence of content of the personal media channel and to display the idle state content on the display, when the display enters an idle state.

14. The system of claim 13, wherein the available non-broadcast, user captured media content includes one or more of audio, still image, video and data.

15. The system of claim 13, wherein the user selects the idle state content by viewing a channel sub-menu of the personal media channel.

16. The system of claim 13, wherein the idle state is entered when the display enters a standby mode.

17. The system of claim 13, wherein idle state is entered when an image on the display is paused.

18. The system of claim 13, wherein the user selects a condition for the display to enter the idle state.

19. The system of claim 18, wherein the user selects and views a channel sub-menu of the personal media channel to select the condition for the display to enter the idle state.

20. The system of claim 18, wherein the user selects the idle state content by viewing the channel sub-menu of the personal media channel.

21. The system of claim 13, wherein the software is included in a set-top box.

22. The system of claim 13, wherein the software is included in a computer.

23. The system of claim 13, wherein the software is included in a television.

24. The system of claim 13, wherein the display is a television.

25. A method to support visual presentations to a viewer via a display, in which the visual presentations are based on a selection made from available non-broadcast, user captured media content, the method comprising:
   utilizing a processing device to select a sequence of content from available non-broadcast, user captured media content for viewing on a personal media channel, wherein the available non-broadcast, user captured media content is stored in a storage and is accessible for viewing on the display;
   constructing, by use of the processing device, a tailored channel guide for the display to view a time sequence of entries corresponding to the sequence of content selected from the available non-broadcast, user captured media content for viewing on the personal media channel;
   selecting, by use of the processing device, idle state content from the sequence of content of the personal media channel; and
   displaying the idle state content on the display, when the display enters an idle state.

26. The method of claim 25, wherein the available non-broadcast, user captured media content includes one or more of audio, still image, video and data.

27. The method of claim 25, wherein when selecting the idle state, the user selects the idle state content by viewing a channel sub-menu of the personal media channel.

28. The method of claim 25, wherein when displaying the idle state, the idle state is entered when the display enters a standby mode.

29. The method of claim 25, wherein when displaying the idle state, the idle state is entered when an image on the display is paused.

30. The method of claim 25, wherein when selecting the idle state, the user selects the idle state by selecting a condition for the display to enter the idle state.

31. The method of claim 30, wherein when the user selects the idle state, the user selects and views a channel sub-menu of the personal media channel to select the condition for the display to enter the idle state.

32. The method of claim 30, wherein when the user selects the idle state, the user selects the idle state content by viewing the channel sub-menu of the personal media channel.

33. The method of claim 25, wherein the processing device is a set-top box.

34. The method of claim 25, wherein the processing device is a computer.

35. The method of claim 25, wherein the processing device is included in a television.

36. The method of claim 25, wherein the display is a television.

* * * * *